United States Patent
Hofberger

(10) Patent No.: US 10,239,298 B2
(45) Date of Patent: Mar. 26, 2019

(54) LAYER ASSEMBLY COMPRISING MINERAL MATERIAL AND GLASS AND METHOD FOR THE PRODUCTION THEREOF

(71) Applicant: Thomas Hofberger GmbH, Taufkirchen (DE)

(72) Inventor: Thomas Hofberger, Taufkirchen (DE)

(73) Assignee: THOMAS HOFBERGER GMBH, Taufkirchen (DE)

( * ) Notice: Subject to any disclaimer, the term of this patent is extended or adjusted under 35 U.S.C. 154(b) by 296 days.

(21) Appl. No.: 15/106,903

(22) PCT Filed: Dec. 19, 2014

(86) PCT No.: PCT/EP2014/078904
§ 371 (c)(1),
(2) Date: Jun. 21, 2016

(87) PCT Pub. No.: WO2015/097111
PCT Pub. Date: Jul. 2, 2015

(65) Prior Publication Data
US 2017/0001423 A1    Jan. 5, 2017

(30) Foreign Application Priority Data
Dec. 23, 2013   (DE) .................. 10 2013 114 856

(51) Int. Cl.
| | | |
|---|---|---|
| B32B 37/00 | (2006.01) | |
| B32B 17/06 | (2006.01) | |
| B32B 37/10 | (2006.01) | |
| B32B 9/00 | (2006.01) | |
| B32B 7/12 | (2006.01) | |
| B32B 37/12 | (2006.01) | |

(52) U.S. Cl.
CPC .............. *B32B 37/003* (2013.01); *B32B 7/12* (2013.01); *B32B 9/002* (2013.01); *B32B 17/06* (2013.01); *B32B 37/10* (2013.01); *B32B 37/12* (2013.01); *B32B 2037/1253* (2013.01); *B32B 2318/04* (2013.01); *B32B 2457/20* (2013.01); *B32B 2479/00* (2013.01); *B32B 2607/00* (2013.01)

(58) Field of Classification Search
CPC .................................................. B32B 37/003
See application file for complete search history.

(56) References Cited

U.S. PATENT DOCUMENTS

| | | | |
|---|---|---|---|
| 2004/0231284 A1 | 11/2004 | Ceysson et al. | |
| 2005/0224156 A1* | 10/2005 | Miyazawa | ............ B32B 37/003 156/73.6 |
| 2009/0029100 A1* | 1/2009 | Wigdorski | ........... B29O 66/342 428/98 |
| 2009/0120585 A1* | 5/2009 | Sampica | ............... B32B 37/003 156/382 |
| 2010/0086723 A1 | 4/2010 | Blanke-Bohne et al. | |
| 2012/0011795 A1 | 1/2012 | Pacione et al. | |

FOREIGN PATENT DOCUMENTS

| | | |
|---|---|---|
| CN | 1685122 A | 10/2005 |
| CN | 1690327 A | 11/2005 |
| CN | 101501285 A | 8/2009 |
| CN | 101971080 A | 2/2011 |
| CN | 102458193 A | 5/2012 |
| DE | 2 154 037 A1 | 5/1973 |
| DE | 33 31 199 A1 | 3/1985 |
| DE | 10 2005 014 945 A1 | 10/2005 |
| DE | 502 02 302 T2 | 12/2005 |
| DE | 10 2005 028 089 A1 | 12/2006 |
| DE | 10 2008 052 066 A1 | 4/2010 |
| DE | 10 2012 112 386 A1 | 5/2014 |
| EP | 0 799 949 A1 | 10/1997 |
| EP | 2 236 287 A2 | 10/2010 |
| JP | 47-001944 B | 1/1972 |
| JP | 54-007415 A | 1/1979 |
| JP | 63-134539 A | 6/1988 |
| JP | 04-009995 A | 1/1992 |
| JP | 04-123225 U | 11/1992 |
| JP | H05-53098 A | 3/1993 |
| JP | 2001-066575 A | 3/2001 |
| JP | 2003-321258 A | 11/2003 |
| JP | 2006-193365 A | 7/2006 |
| WO | 2003/018310 A1 | 3/2003 |

(Continued)

OTHER PUBLICATIONS

International Search Report for corresponding International Application No. PCT/EP2014/078904 dated Mar. 5, 2015.

*Primary Examiner* — Robert T Butcher
(74) *Attorney, Agent, or Firm* — Renner Otto Boisselle & Sklar

(57) ABSTRACT

A method for producing a layer assembly, wherein the layer assembly includes a substrate, an outer layer and an adhesive layer arranged between the substrate and the outer layer and the adhesive layer makes at least partial contact with the substrate and the outer layer, includes the step of: swiveling the substrate and the outer layer towards one another, such that the distance between the top substrate edge and the top outer layer edge decreases and the adhesive is moved in the direction of the top substrate edge and of the top outer layer edge; wherein this is carried out in such a manner that, during at least part of step B), the angle bisector of the angle α adopts an angle of ≥−45° to ≤45° with respect to the vertical.

12 Claims, 12 Drawing Sheets

(56) References Cited

FOREIGN PATENT DOCUMENTS

| WO | 2008/017287 A1 | 2/2008 |
| WO | 2009/091923 A2 | 7/2009 |
| WO | 2011/024083 A2 | 3/2011 |
| WO | 2011/049197 A1 | 4/2011 |
| WO | 2011/104227 A1 | 9/2011 |

* cited by examiner

000
LAYER ASSEMBLY COMPRISING MINERAL MATERIAL AND GLASS AND METHOD FOR THE PRODUCTION THEREOF

This application is a national phase of International Application No. PCT/EP2014/078904 filed Dec. 19, 2014 and claims priority to DE 10 2013 114 856.5 filed on Dec. 23, 2013.

TECHNICAL FIELD

The present invention relates to a layered composite material comprising a substrate, a cover layer and an adhesive layer disposed between the substrate and the cover layer, wherein the adhesive layer at least partially contacts the substrate and the cover layer. The invention further relates to a method for producing such layered composite materials and its use in decoration, furniture and building protection applications.

BACKGROUND

Composite elements of natural stone slabs and decorative or protective cover layers are the object of intensive development work. This, inter alia is rooted in the desire to utilize the decorative features of the natural stone in environments that due to the properties inherent to many natural stone materials such as porosity, presence of capillary networks or sensitivity to chemicals do not readily come into question.

EP 0799949 A1 discloses a natural stone element made of at least one thin natural stone slab and a carrier plate connected therewith over a large area, wherein the carrier plate consists of at least one glass sheet which is connected with the natural stone slab by means of a preferably transparent cast resin layer, and the natural stone elements are connected to each other or to a support element.

DE 602 02 302 T2 (originating from WO 03/018310) describes a method for producing a composite plate which includes a plate made of rock and a glass sheet which are joined together including the following method steps: providing a rock plate; coating at least a central portion of the surface of said rock plate with a layer of thermosetting reaction resin in a liquid state; providing a glass sheet above said rock plate, wherein the surface of glass sheet disposed opposite to the rock plate is forced into a convex shape; transferring said glass sheet in the vicinity of the rock plate, wherein a central region of the glass sheet is brought into contact with the resin provided on a corresponding central region of the rock plate; gradually lowering the convex shape of the glass sheet until the curvature becomes zero, wherein the glass sheet is caused to adhere to the rock plate and said resin is uniformly distributed between the rock plate and the glass sheet and uniformly compressing said rock plate with the glass sheet during the curing of the thermosetting resin.

WO 2008/017287 A1 relates to a stone-glass element comprising at least one stone slab and a carrier plate which comprises at least one glass sheet which is connected to the stone slab by means of a transparent or opaque cast resin layer over a large area, wherein the surface of the stone slab disposed opposite to the carrier plate (1) is provided with a moisture-repellent cover layer and/or a cover plate. The stone slab comprises a capillary cut which extends parallel to at least one side edge and is filled with a sealant which prevents moisture diffusion towards the interior of the stone slab.

DE 10 2008 052 066 A1 discloses an article comprising a disc-shaped layered composite material having two major surfaces and a peripheral edge surface including in the order listed disposed above each other and firmly joined together: a first mechanically stable, transparent layer, a first transparent, tear-resistant, adhesion enhancing layer, an opaque or translucent stone layer free of or substantially free of volatile compounds, a second transparent, tear-resistant, adhesion enhancing layer and a second mechanically stable, transparent layer as well as an all-round sealing of the peripheral edge surface.

The method for producing this article is characterized in that volatile compounds are substantially or completely removed from a translucent or opaque stone layer, the translucent layer is respectively firmly joined to a mechanically stable, transparent layer via a respective transparent, tear-resistant adhesion enhancing layer such that plate-like translucent composite material having two major surfaces and a peripheral edge surface is obtained, and the peripheral edge surface is provided with an all-round sealing.

According to this patent application the article finds use as a decorative and/or architectural article and/or a decorative and/or architectural component for indoor and outdoor use or for its production.

DE 10 2005 014 945 A1 discloses a glass based wall cladding, in particularly in the form of tiles for cladding walls, such as murals, floors or ceilings of a living room, comprising a glass substrate, which is coated with a layer of varnish on a surface to be mounted on the walls, wherein said varnish as a protective layer against corrosive attacks has such a low water permeability that said cladding can be attached to the walls by use of ordinary mortar adhesives or cement adhesives mixed with water.

During the bonding of natural stone slabs to glass cover layers air bubbles can enter in the adhesive used. The main sources of such air bubbles are mixing processes during the use of two-component adhesives and the filling of the adhesive into the gap between the natural stone slab and the glass cover layer.

Air bubbles entrapped in the cured adhesive layer are undesirable for two reasons. On the one hand they introduce mechanical weaknesses into the bond. They also interfere with the aesthetic appearance of the composite article, which will not be tolerated by the customer especially in the field of high-quality interior decoration articles.

SUMMARY

It is the object of the present invention to overcome at least partially the abovementioned disadvantages of the prior art. Particularly, it is an object of the invention to provide a method for producing such composite elements, in which a substantially bubble-free bond can be achieved. Moreover, the bonding process should be adapted to further integrate functional elements or functional layers in the composite element in a simple manner.

This object is achieved according to the invention by a method according to claim 1. Further aspects of the invention are a layered composite material according to claim 13 and the use of claim 15. Advantageous developments of the invention are specified in the respective dependent claims. They can be arbitrarily combined with each other, unless anything to the contrary clearly arises from the context.

Thus, a first aspect of the present invention is a method for producing a layered composite material, wherein said layered composite material comprises a substrate, a cover layer and an adhesive layer disposed between the substrate and the cover layer and the adhesive layer at least partially contacts the substrate and the cover layer, comprising the steps of:

A) providing an assembly which comprises a substrate and a cover layer, wherein the substrate comprises a first substrate side with an upper substrate edge when viewed in the vertical direction, a lower substrate edge when viewed in the vertical direction, a first substrate side edge and a second substrate side edge disposed opposite to the first substrate side edge;

the cover layer comprises a first cover layer side with an upper cover layer edge when viewed in the vertical direction, a lower cover layer edge when viewed in the vertical direction, a first cover layer side edge and a second cover layer side edge disposed opposite to the first cover layer side edge;

the first substrate side and the first cover layer side in the assembly face each other under an angle α and a bisector of the angle α is formed;

the upper substrate edge and the upper cover layer edges in the assembly are disposed opposite to each other;

the lower substrate edge and the lower cover layer edge in the assembly are disposed opposite to each other;

the first substrate side edge and the first cover layer side edge in the assembly are disposed opposite to each other;

the second substrate side edge and the second cover layer side edge in the assembly are disposed opposite to each other;

in the assembly the distance between the upper substrate edge and the upper cover layer edge is larger than the distance between the lower substrate edge and the lower cover layer edge;

in the assembly a first seal is provided between the lower substrate edge and the lower cover layer edge which prevents the escape of fluids between the lower substrate edge and the lower cover layer edge;

in the assembly a second seal is provided between the first substrate side edge and the first cover layer side edge which prevents the escape of fluids between the first substrate side edge and the first cover layer side edge;

in the assembly a third seal is provided between the second substrate side edge and the second cover layer side edge which prevents the escape of fluids between the second substrate side edge and the second cover layer side edge;

such that the assembly forms a one side open container for accommodating fluids and further a curable adhesive is provided in the container;

B) pivoting the substrate and the cover layer towards each other so that the distance between the upper substrate edge and the upper cover layer edge decreases and the adhesive is moved towards the upper substrate edge and the upper cover layer edge;

wherein the step B) is carried out such that during at least a part of step B) the bisector of the angle α with respect to the vertical is in the range ≥−45° to ≤45°.

It has surprisingly been found that by means of the procedure used in the method according to the invention in which the approach of the substrate to be adhered and the cover layer (expressed simplified and exemplary) is implemented in an upright manner any air bubbles in the liquid adhesive rise upwards and can escape from the adhesive gap.

The method according to the invention can also be implemented easily by less experienced users. Because at the beginning of the bonding process the substrate and the cover layer are arranged in a "V"-like configuration functional elements and/or decorative elements can be inserted in a simple manner and bonded as well.

After Step B) in the method further steps such as turning the layered composite material into the horizontal, compressing, curing of the adhesive by heating or radiation, etc. can be implemented.

Another aspect of the present invention is a layered composite material comprising a substrate, a cover layer and a cured adhesive layer disposed between the substrate and the cover layer, wherein the adhesive layer at least partially contacts the substrate and the cover layer, wherein the substrate comprises a mineral material, the cover layer comprises a glass, an electrical functional unit is arranged between the substrate and the cover layer and in the layered composite material the average amount of gas bubbles entrapped in the adhesive layer with a maximum size of ≥100 μm is less than 100 gas bubbles/m².

Finally, the present invention relates to the use of a layered composite material according to the invention as decorative article, as a furniture article or as a building protection article.

BRIEF DESCRIPTION OF THE DRAWINGS

The present invention is further explained with respect to the following figures without being limited thereto.

In the drawings.

DETAILED DESCRIPTION

Figure 1:
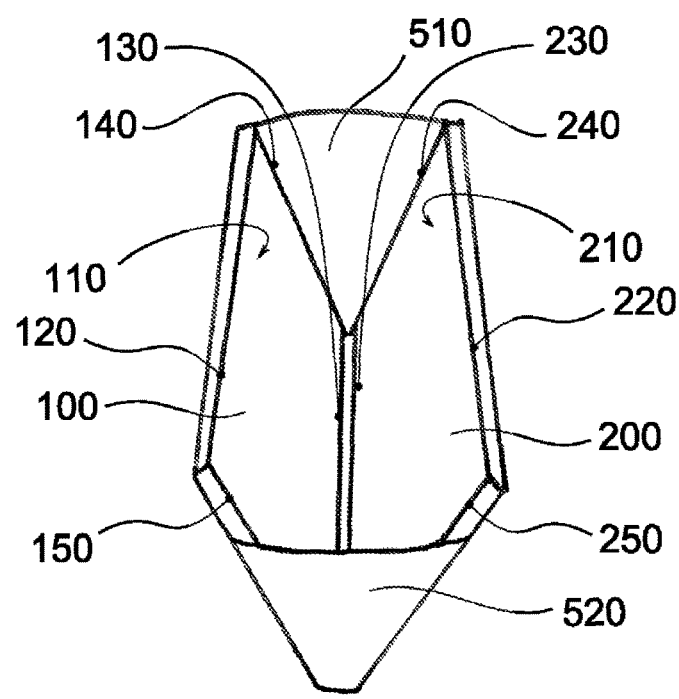
FIG. 1 shows an assembly in the method according to the invention in a diagonal view from above.

FIG. 1 shows an assembly for use in the method according to the invention based on which some spatial relationships and geometric definitions are to be explained. However, for a better overview in FIG. 1 no adhesive provided in the assembly is shown.

As already described, an assembly of a substrate and a cover layer is provided in the method according to the invention. Herein, the way for constructing this assembly, for example the individual steps and their sequence, is not fixed.

In the assembly shown in FIG. 1 a substrate 100 and a cover layer 200 are provided. The substrate has a first substrate side 110. This first substrate side 110 will later be adhered to the corresponding first cover layer side 210 of the cover layer 200.

At the involved substrate and cover layer sides, respectively, different edges are defined. The first substrate side 110 has an upper substrate edge 120 when viewed in the vertical direction (against gravity) and a lower substrate edge 130 opposite thereto when viewed in the vertical direction. In the case shown in FIG. 1 these edges extend horizontally. Adjacent to the upper and lower substrate edges 120, 130 the substrate side edges 140 and 150 are arranged, which here extend vertically.

Likewise, the first cover layer side 210 has an upper cover layer edge 220, a lower cover layer edge 230 and two cover layer side edges 240, 250 disposed opposite to each other.

The first substrate side 110 and the first cover layer side 210 face each other such that the substrate 200 and the cover layer 210 represents an approximately "V"-shaped structure. The upper substrate edge 120 and the upper cover layer edge 220 as well as the lower substrate edge 130 and the lower cover layer edge 230 are disposed opposite to each other. Similarly, the first substrate side edge 140 and first cover layer side edge 240 as well as the second substrate side edge 150 and the second cover layer side edge 250 are disposed opposite to each other.

In accordance with the description of the structure as "V"-shaped the distance between the upper substrate edge 120 and the upper cover layer edge 220 is greater than the distance between the lower substrate edge 130 and the lower cover layer edge 230.

By the use of sealing means the "V"-shaped structure becomes a container open to the top or figuratively speaking a trough. These sealing means seal the gaps between the opposing edges of the substrate 100 and the cover layer 200.

Herein, a second seal 510 seals between the first substrate side edge 140 and the first cover layer side edge 240 and a third seal 520 seals between the second substrate side edge 150 and the second cover layer side edge.

The fact that the assembly in the method according to the invention is open on one side and in particular "open to the top", means that escaping adhesive finds enough space to leave the gap formed between the substrate 100 and cover layer 200. The case of the one side open configuration includes that the assembly is covered all around but the adhesive can escape as mentioned above.

Figure 2:
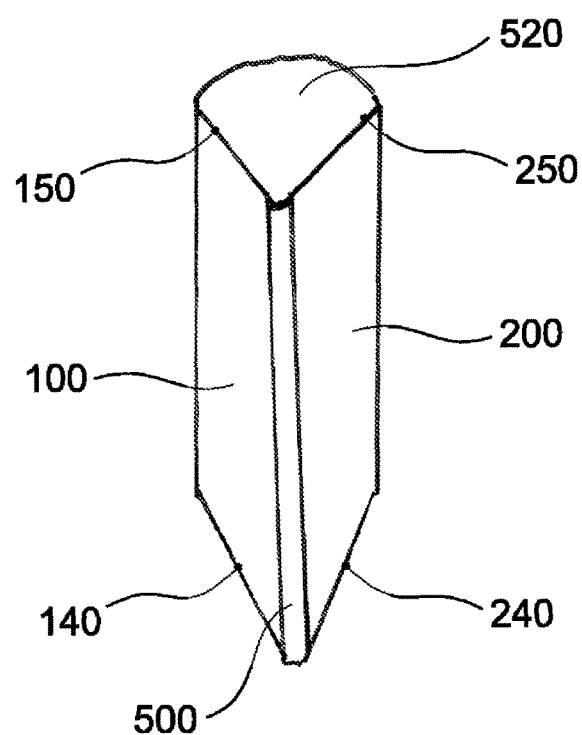
FIG. 2 shows an assembly in the method according to the invention in a diagonal view from below.

FIG. 2 shows the assembly from FIG. 1 when viewed diagonally from below. Again, the substrate 100 and the cover layer 200, the side edges 140, 150, 240 and 250 and one of the lateral seals 520 can be recognized. In addition, here the first seal 500 can be recognized which prevents the escape of fluids (especially adhesive) between the lower edge of the substrate and the cover layer.

The first seal 500, the second seal 510 and the third seal 520 are configured, for example, by overlapping such that as a whole the assembly represents a container open to the top which can accommodate an adhesive. However, they can also be combined and, for example, as a whole be provided as one sealing element.

Figure 3:
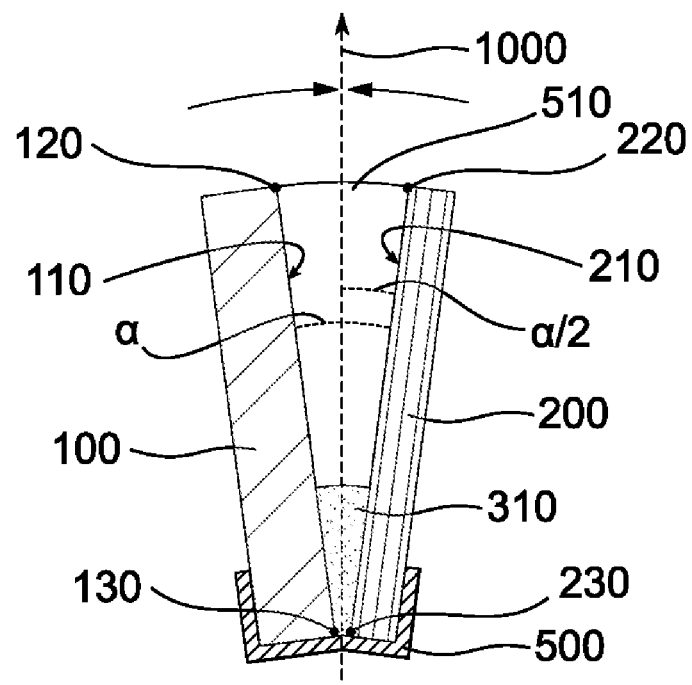
FIG. 3 shows an assembly in the method according to the invention in a lateral cross-sectional view.

FIG. 3 shows a cross-sectional view of the assembly shown in FIG. 1 and FIG. 2, but now a curable adhesive 310 is provided in the container open to the top. The adhesive thus already contacts at least partially the first substrate side 110 and the first cover layer side 210.

Its escape from the container is prevented by means of the seals provided. Due to the cross-sectional view the seal 520 of FIGS. 1 and 2 is not shown in FIG. 3. Whether the adhesive 310 is filled into the finished "trough" of the substrate 100, the cover layer 200 and the seals 500, 510, 520 or, for example, is already present on the substrate and/or the cover layer and then the "trough" is build up, is not relevant for the method according to the invention.

Suitable adhesives in the method according to the invention are preferably transparent, in particular two-component adhesives such as epoxy and polyurethane resins, and radiation curable adhesives such as (meth)acrylates and urethane (meth)acrylates. Among the epoxy resins those with cycloaliphatic polyamine curing agents are preferred.

An angle α is formed between the first substrate side 110 and the first cover layer side 210. Accordingly, a bisector 1000 can be constructed.

In the method according to the invention a pivoting movement of the substrate 100 and the cover layer toward one another is implemented. Here, at least the distance between the upper substrate edge 120 and the upper cover layer edge 220 increases. Figuratively speaking, this can be compared to clapping a book shut. The "spine" in this case is formed by the lower edges 130, 230 and the lower first seal 500. The pivoting movement is symbolized in FIG. 3 by the two curved arrows.

The pivoting movement of the substrate 100 and the cover layer 200 toward each other has the consequence that the adhesive disposed between them is continuously pressed along the gap between the substrate 100 and the cover layer 200. Thus, it is also continuously moved in the direction of the upper substrate edge 120 and the upper cover layer edge 120.

In the method according to the invention it is further contemplated that during at least a part of step B (pivoting movement) the bisector 1000 of the angle α becomes an angle in the range of ≥−45° to ≤45° with respect to the vertical. In this way it is achieved that the opening of the assembly always faces upwards so that air bubbles entrapped in the adhesive can also rise upwards and leave the gap between the substrate 100 and the cover layer 100. Preferably, the bisector 1000 of the angle α becomes an angle in the range of ≥−30° to ≤30°, more preferably ≥−15° to ≤15° with respect to the vertical. Then one can speak of a "standing bonding" of the substrate 100 and the cover layer 200.

In FIG. 3, the bisector 1000 has an angle of 0° with respect to the vertical. Negative angles in this case mean that the bisector 1000 is tilted to the left, positive angles symbolize a tilt in the opposite direction. In this respect, the sign of the tilt angle is also dependent on the point of view.

The lower substrate edge 130 and the lower cover layer edge 230 need not necessarily be in contact with each other. Due to the fact that the first seal 500 is provided, they may be spaced apart. Their spacing may be selected in consideration of the desired thickness of the adhesive layer in the finished layered composite material.

Figure 4:
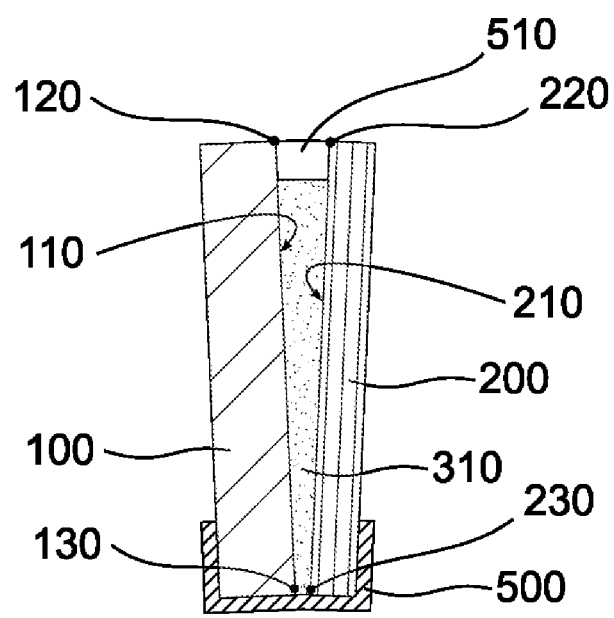
FIG. 4 shows the assembly of FIG. 3 in the further progress of the method according to the invention.
Figure 5:
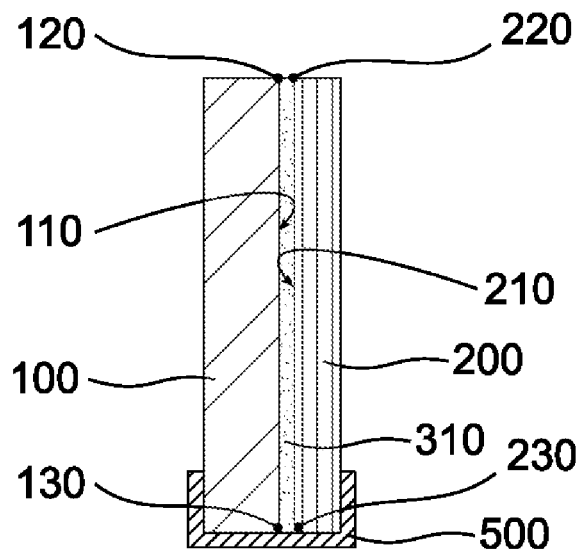
FIG. 5 shows the assembly of FIG. 4 in the further progress of the method according to the invention.

The process of moving the adhesive 310 upwards by pivoting the substrate 100 and cover layer 200 toward each other will later by explained as an intermediate step with respect to FIG. 4 and as final state with respect to FIG. 5. Excess adhesive including gas bubbles disposed therein and risen upwards can be stripped off at the upper edges 120, 220 or otherwise be removed.

It is possible to pretreat the substrate and/or the cover layer. In this way glass surfaces can be made more wettable and porous natural stone surfaces can be presealed.

In one embodiment of the method according to the invention the first substrate side 110 and/or the first cover layer side 210 are planar. The term "planar" includes surface irregularities and machining marks (intentional and unintentional) which then are filled with adhesive. This is the preferred variant although the method according to the invention can be carried out even with non-planar surfaces, provided that the amount of adhesive used is adjusted accordingly.

In a further embodiment of the method according to the invention the substrate 100 and/or the cover layer 200 are formed in a cuboid shape. In this way already tailored substrate and/or cover layer plates can be used.

In a further embodiment of the method according to the invention the substrate 100 comprises a mineral material and/or the cover layer 100 comprises a glass. Suitable mineral materials are, for example, stone, natural stone, concrete, gypsum and the like. Examples of suitable glasses are E-glass, S-glass, M-glass, quartz glass, borosilicate glass, crown glass, soda-lime glass, float glass, flint glass and/or lead crystal glass. The glass may be colored, but a transparent glass cover layer is preferable. "Natural stone" generally means all rocks as found in nature. Preferred natural stones are granite, marble, quartz, quartz composite, travertine, sandstone, slate and agate.

Preferably, the substrate 100 comprises a natural stone and the cover layer 200 comprises a glass.

In a further embodiment of the method according to the invention the substrate 100 comprises an electrical functional unit and the cover layer 200 comprises a glass. Preferably the electrical functional units are display devices such as TFT or LED displays, sensor devices such as brightness sensors, temperature sensors or capacitive sensors (so-called "touch" sensors) or heating devices, in particular devices for inductive heating. Then aesthetically very pleasing induction hobs can be prepared.

In a further embodiment of the method according to the invention the first seal 500, the second seal 510 and/or the third seal 520 are implemented in the form of an elastic film. Preferably, the elastic films are self-adhesive such that they can be easily connected with the respective edges of the substrate 100 and the cover layer 200. The degree of elasticity should be such that a film attached to the lower edges 130, 230 as the lower seal 500 is able to follow the movement of the bottom portion of the substrate 100 and the cover layer 200 apart from each other (due to the presence of the adhesive 310) during the folding process without loss of the sealing effect. Regarding the lateral seals 510, 520 the film should be at least so flexible that it is able to move outwardly when the substrate 100 and the cover layer 200 are folded toward each other.

Figure 6:
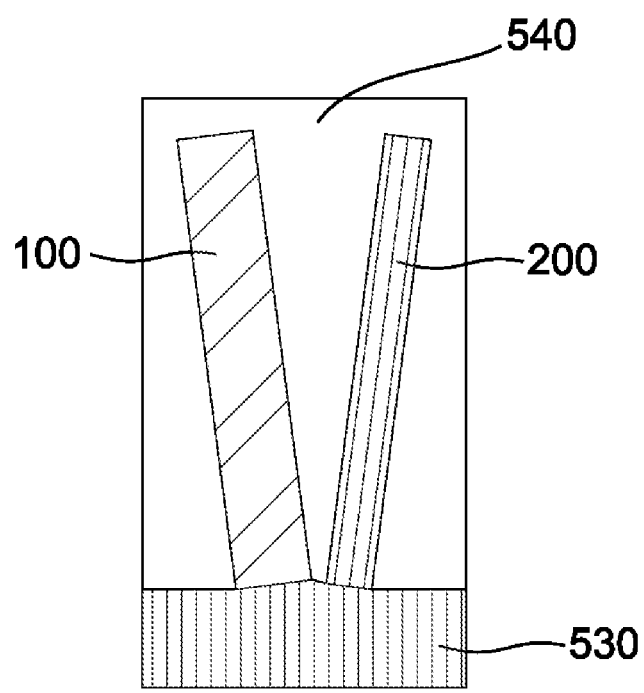
FIG. 6 shows another assembly in the method according to the invention in a lateral cross-sectional view.

In a further embodiment of the method according to the invention the first seal, the second seal and/or the third seal are implemented in the form of elastomeric surface portions with respect to which the substrate and the cover layer are movable. This is shown schematically in FIG. 6, in which due to the cross-sectional view a seal is not shown. For reasons of clarity the adhesive is not shown, either. This embodiment is based on the concept that during the folding of the substrate 100 and the cover layer 200 toward each other they abut against the seals (530, 540) in such a way that during a relative movement of the substrate and/or the cover layer with respect to the seals an appropriate sealing against escaping fluids, in particular an adhesive, is still achieved. By use of this embodiment the seals can be reused. FIG. 6 also shows schematically that the lower seal 530 is so soft that it is able to follow the contours of the substrate and the cover layer at their bottom sides and also ensures a sealing effect during the folding process.

In a further embodiment of the method according to the invention the first seal, the second seal and/or the third seal are implemented in the form of a fluidically expandable sealing member with respect to which the substrate 100 and the cover layer 200 are movable. This variant is related to the previously described variant of the elastic surface elements. Here, too, it is possible to reuse the seals and to carry out the bonding process automatically. The expansion of the seals, which in simplified terms can be regarded as "cushions", can be done by inflating with air or hydraulically.

In a further embodiment of the method according to the invention, moreover, a decorative layer is provided between the substrate 100 and the cover layer 200. In this way logos, advertising materials, etc. can be integrated into the layered composite material.

In a further embodiment of the method according to the invention, moreover, an electrical functional unit 400 (see FIG. 7) is provided between the substrate 100 and the cover layer 200. The electric functional unit can be inserted into the assembly before or after filling with the adhesive and then be integrated in the resulting layered composite material during the pivoting process according to step B). Preferably the amount of adhesive is selected so that the electric functional unit is completely surrounded by the adhesive.

"Electrical functional units" can be electrical loads such as sensors, actuators or lighting elements as well as electrical generators such as photovoltaic cells. They can further be contacted through the adhesive layer, through the substrate or the cover layer. Preferably, the electrical functional units are display devices such as TFT or LED displays, sensor devices such as brightness sensors, temperature sensors or capacitive sensors (so-called "touch" sensors) or heating devices, in particular devices for inductive heating. Then aesthetically very pleasing induction hobs can be prepared.

In a further embodiment of the method according to the invention the adhesive 310 is set into vibration during step B). This can be done by vibrating the entire assembly, or by inserting a vibrator directly into the adhesive. By means of the vibration an even faster rising of the gas bubbles in the adhesive can be achieved.

In a further embodiment of the method according to the invention the substrate 100 and the cover layer 200 are alternately pivoted toward each other and away from each other during step B). Preferably, the pivoting movement toward each other is implemented faster than the pivoting movement away from each other. This pulsating approach also helps that gas bubbles are transported faster upwards from the adhesive such that they can no longer be entrapped in the gap between the substrate and the cover layer.

In a further embodiment of the method according to the invention the assembly is at least temporarily tilted with respect to the horizontal in step A) and/or in step B). This is to be understood so that a pair of corners which are respectively formed by a side edge and a lower edge (130/140 and 230/240 or 130/150 and 230/250) when viewed in the vertical direction is disposed higher than the other pair of corners. In other words, the assembly is rotated about an axis which extends perpendicular to the substrate 100, the cover layer 200 or an intermediate plane. Then, a liquid adhesive is provided in a lower "pocket" or is filled into this "pocket". This can also be utilized in automatically filling with an adhesive by gradually filling adhesive into the assembly from a filling distributor whose individual conduits can individually be driven. In this way a lower amount of gas bubbles is achieved already during the filling process.

Figure 7:
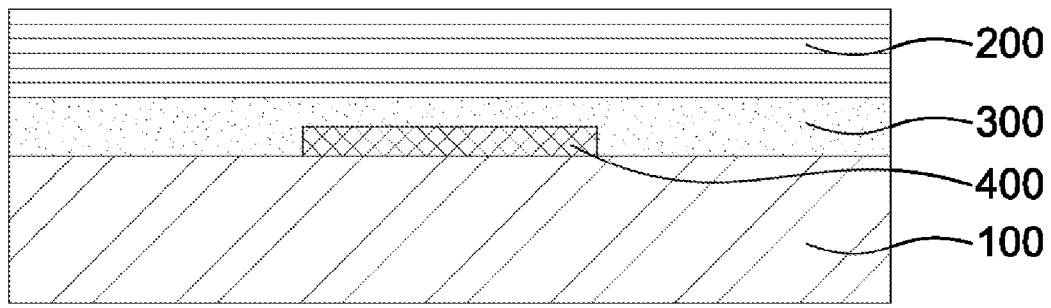
FIG. 7 shows a layered composite material according to the invention in a lateral cross-sectional view.

FIG. 7 shows a cross-sectional view of a layered composite material according to the invention comprising a substrate 100, a cover layer 200, a cured adhesive layer 300 and an electric functional unit 400 embedded into the adhesive layer between the substrate 100 and the cover layer 200. It is contemplated that in the layered composite material according to the invention which of course can be produced by the method according to the invention the substrate 100 comprises a mineral material and the cover layer 200 comprises a glass. Suitable mineral materials are, for example, stone, natural stone, concrete, gypsum and the like. Examples of suitable glasses are E-glass, S-glass, M-glass, quartz glass, borosilicate glass, crown glass, soda-lime glass, float glass, flint glass and/or lead crystal glass. The glass may be colored, but a transparent glass cover layer is preferable. "Natural stone" means generally all rocks as found in nature. Preferred natural stones are granite, marble, quartz, quartz composite, travertine, sandstone, slate and agate.

"Electrical functional units", as already mentioned in connection with the method according to the invention, can be both electrical loads such as sensors, actuators or lighting elements and electrical generators such as photovoltaic cells. Moreover, they can be contacted through the adhesive layer, through the substrate or through the cover layer.

Suitable adhesives which result in the cured adhesive layer 300 in particular are two-component adhesives such as epoxy and polyurethane resins and radiation curable adhesives such as (meth)acrylates and urethane(meth)acrylates. Among the epoxy resins those comprising cycloaliphatic polyamine curing agents are preferred. Generally, it is preferred that the cured adhesive layer is transparent (in many product data sheets also referred to as "optically clear").

It is contemplated that in the layered composite material according to the invention the average amount of air bubbles entrapped in the adhesive layer with a maximum size of ≥100 μm is less than 100 gas bubbles/m$^2$. The amount of gas bubbles can, for example, be determined by means of optical inspection and counting the gas bubbles. Moreover, automated processes are contemplated that examine the layered composite material by means of a camera and software for image processing. Gas bubbles with a maximum size of ≥100 μm are normally no longer observable with the naked eye. Their average amount is preferably less than 10 gas bubbles/m$^2$, more preferably less than 1 gas bubble/m$^2$. The lower the amount of gas bubbles is the higher the quality of the layered composite material is perceived by the end user.

Figure 8:
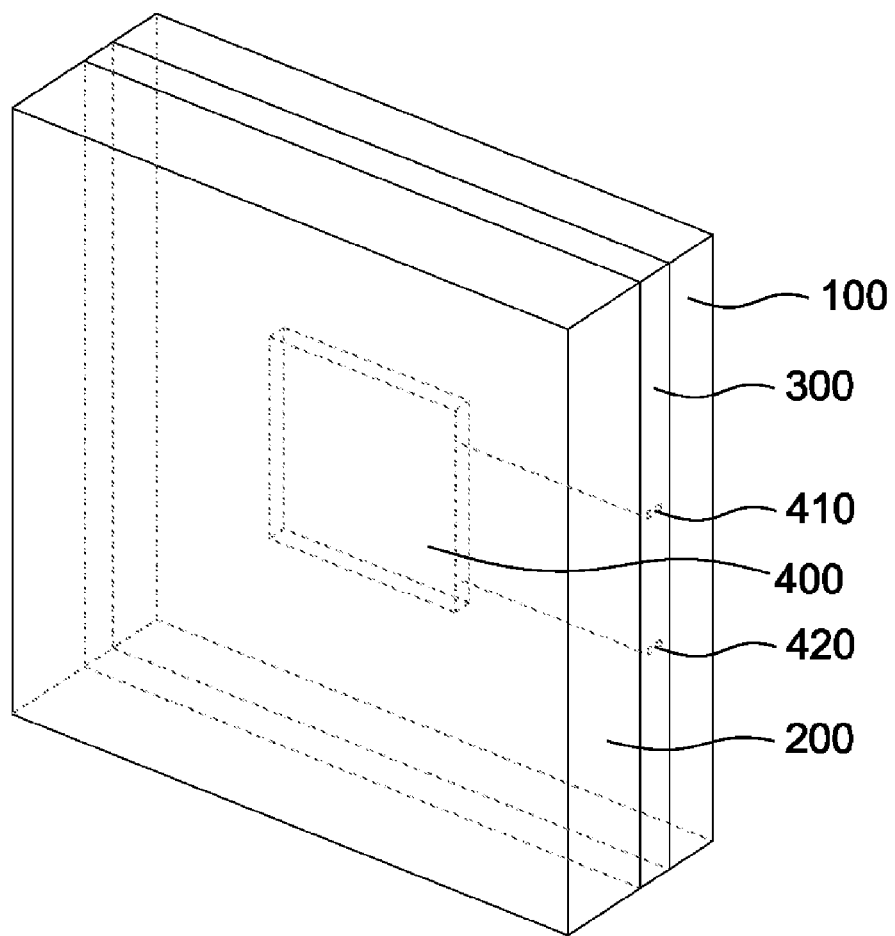
FIG. 8 shows another layered composite material according to the invention.

FIG. 8 shows a perspective view of a layered composite material according to the invention. Here, in addition to FIG. 7 electrical contacts 410, 420 are shown which are led out from the electrical functional unit 400 to the edge of the adhesive layer 300.

In one embodiment of the layered composite material according to the invention the electrical functional unit 400 is a display device, a sensor device or a heating device. Preferably the electrical functional units are display devices such as TFT or LED displays, sensor devices such as brightness sensors, temperature sensors or capacitive sensors (so-called "touch" sensors) or heating devices, in particular devices for inductive heating. Then the layered composite materials according to the invention can represent aesthetically very pleasing induction hobs.

FIGS. 9-21 show individual steps in a further variant of the method according to the invention. The geometric descriptors of the substrate 100 and the cover layer 200 are the same as in FIGS. 1-5. For clarity they are not specifically mentioned in FIGS. 9-21.

Figure 9:
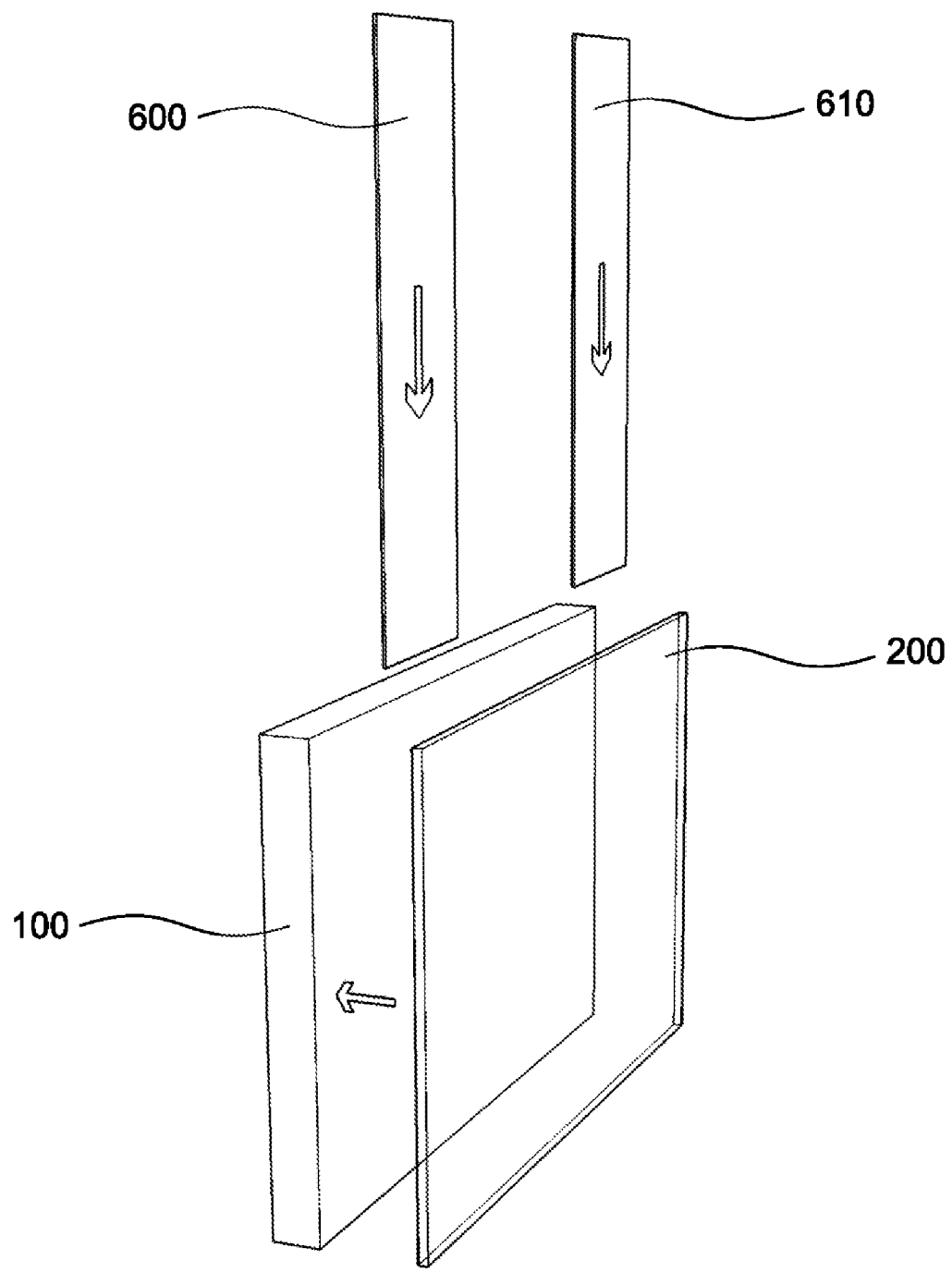
FIGS. 9-21 show other assemblies in a method according to the invention.

According to FIG. 9 the substrate 100 and the cover layer are placed upright and parallel to each other. Two spacers 600, 610 are placed between these components. These spacers 600, 610, for example, may have a thickness of ≥0.5 mm to ≤1.5 mm. The thickness of the spacers affects the distance between the substrate 100 and the cover layer 200 in the finished product.

Figure 10:
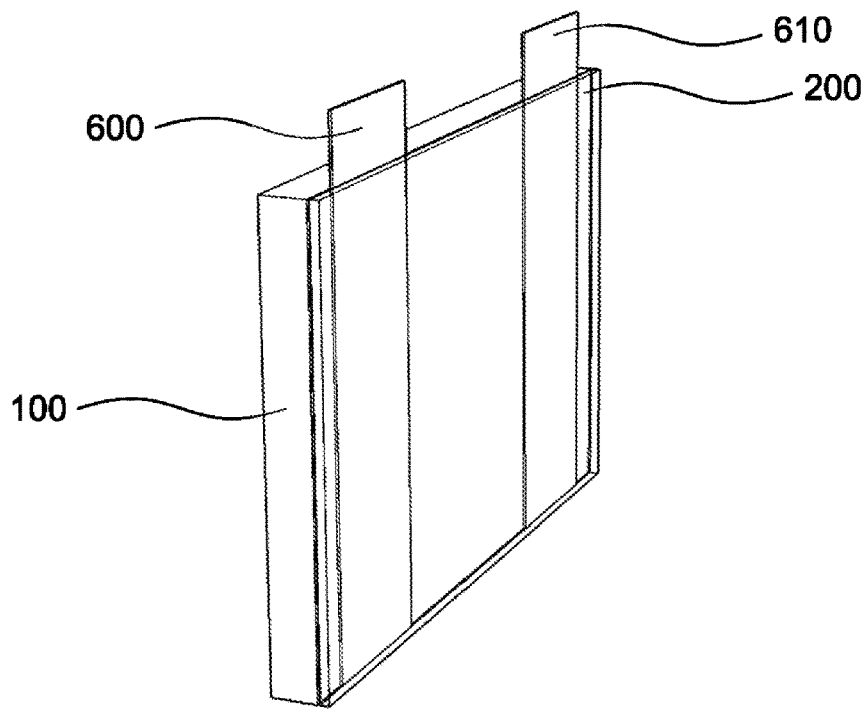

FIG. 10 shows the assembly of the substrate 100 and the cover layer 200 with inserted spacers 600, 610. The projecting ends of the first seal 500 were folded back and bonded to the substrate 100 and the cover layer 200, respectively.

Figure 11:
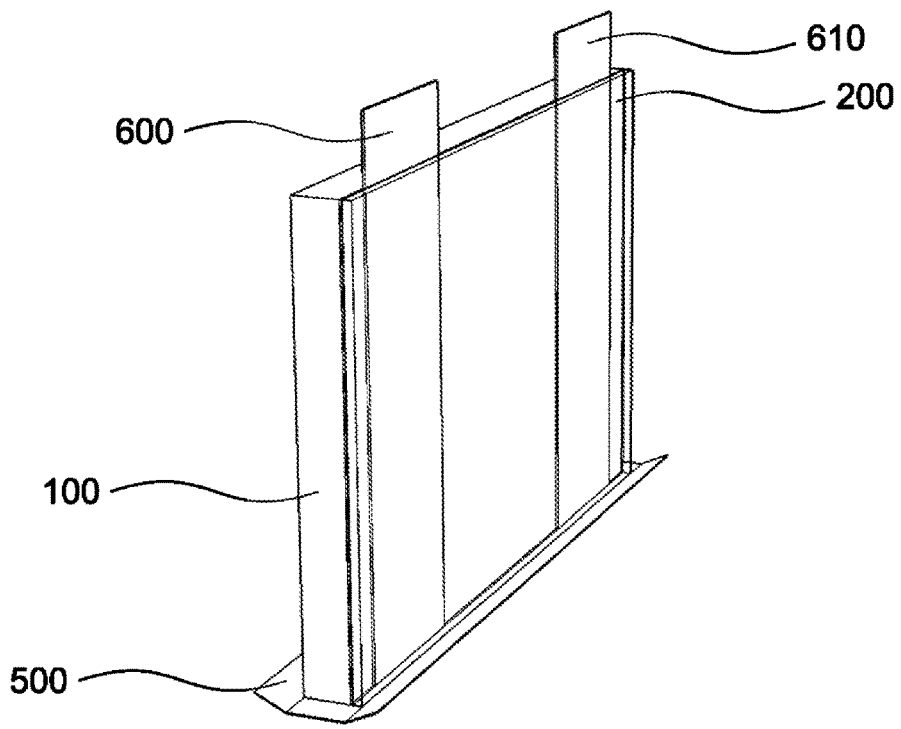

FIG. 11 shows, how a first seal 500 is attached between the lower edge of the substrate 100 and the lower edge of the cover layer 200 in the assembly according to FIG. 10. The first seal 500 in the form of a flexible or elastic adhesive film prevents that later filled adhesive flows out from the gap produced by the spacers 600, 610 between the substrate 100 and the cover layer 200.

Figure 12:
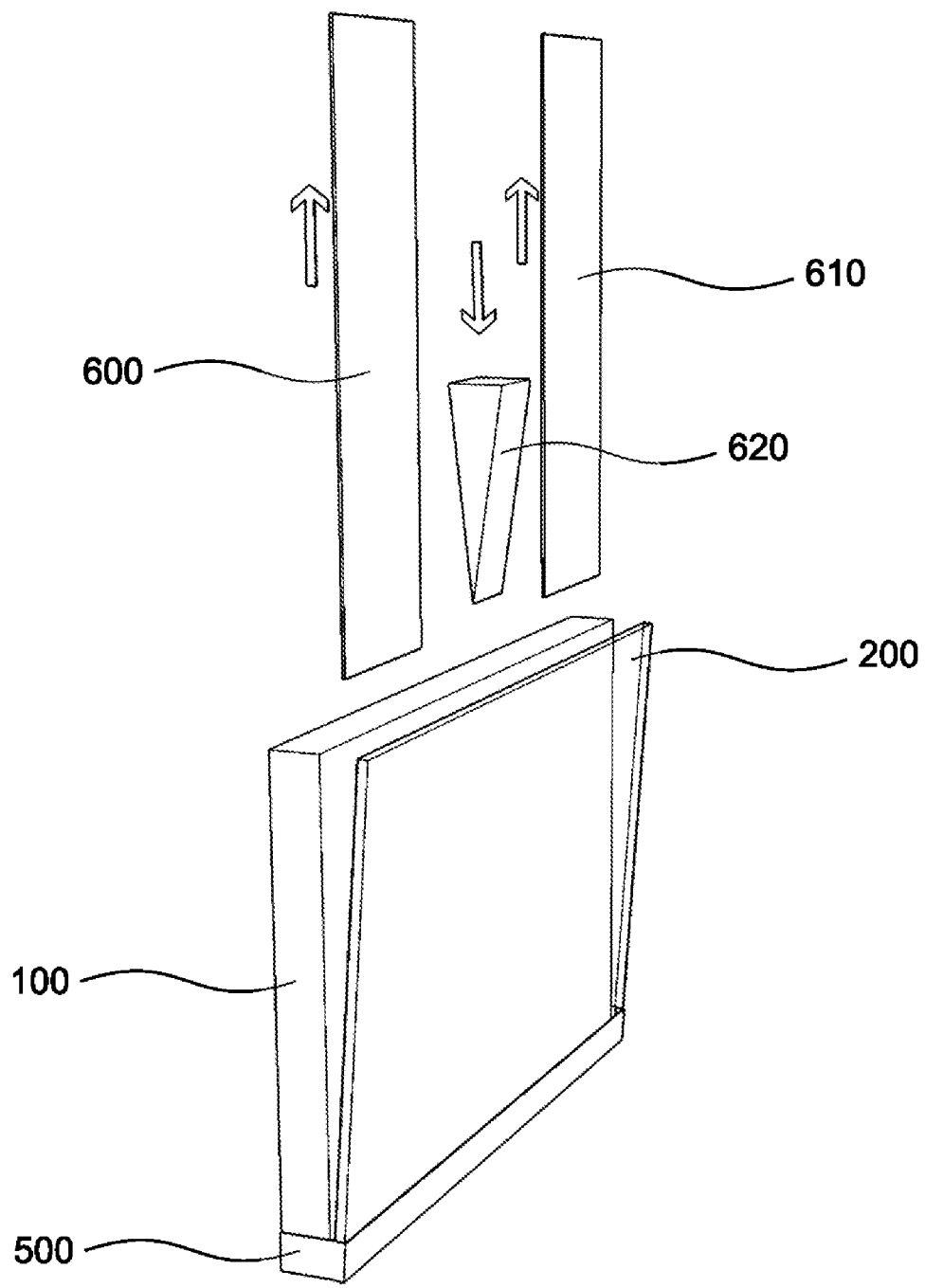

FIG. 12 shows, how the spacers 600, 610 are removed and a wedge shaped spacer 620 is inserted between the substrate 100 and the cover layer 200 in the assembly according to FIG. 11. This has the result that the substrate 100 and the cover layer 200 now are tilted with respect to each other.

Figure 13:
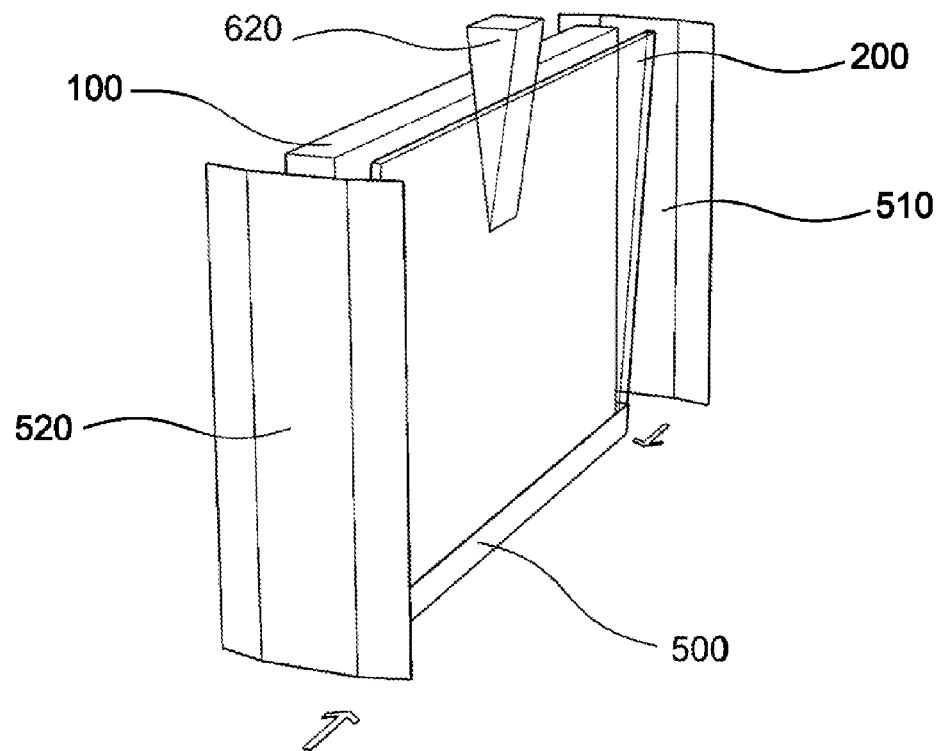

Next, as shown in FIG. 13, a second seal 510 and a third seal 520 are attached to the respective side edges of the assembly. The second seal 510 and the third seal 520, too, are flexible or elastic adhesive films.

Figure 14:
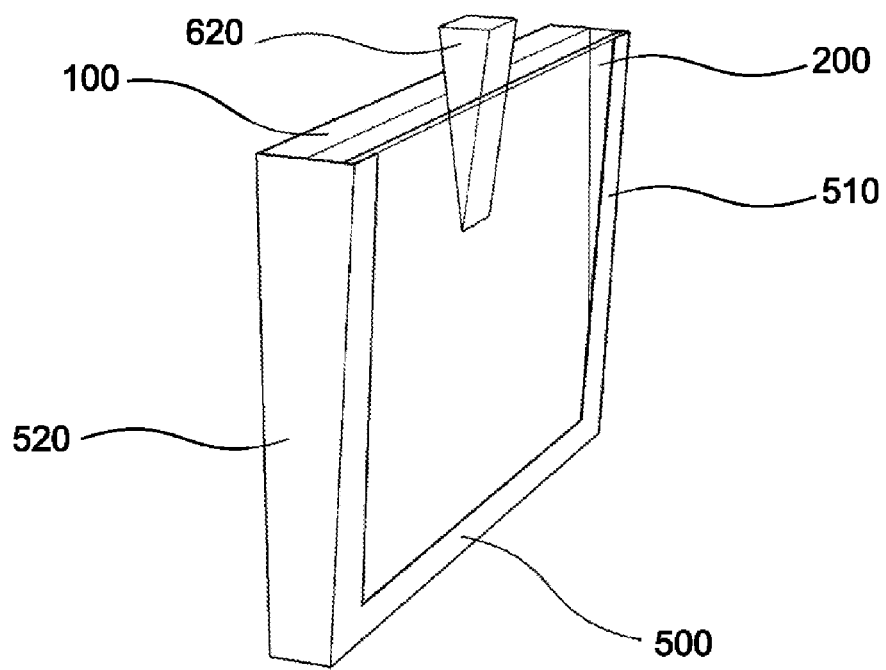

FIG. 14 shows how, starting from the assembly shown in FIG. 13, the ends of the second seal 510 and third seal 520 are folded back and bonded to the substrate 100 and the cover layer 200, respectively.

Figure 15:
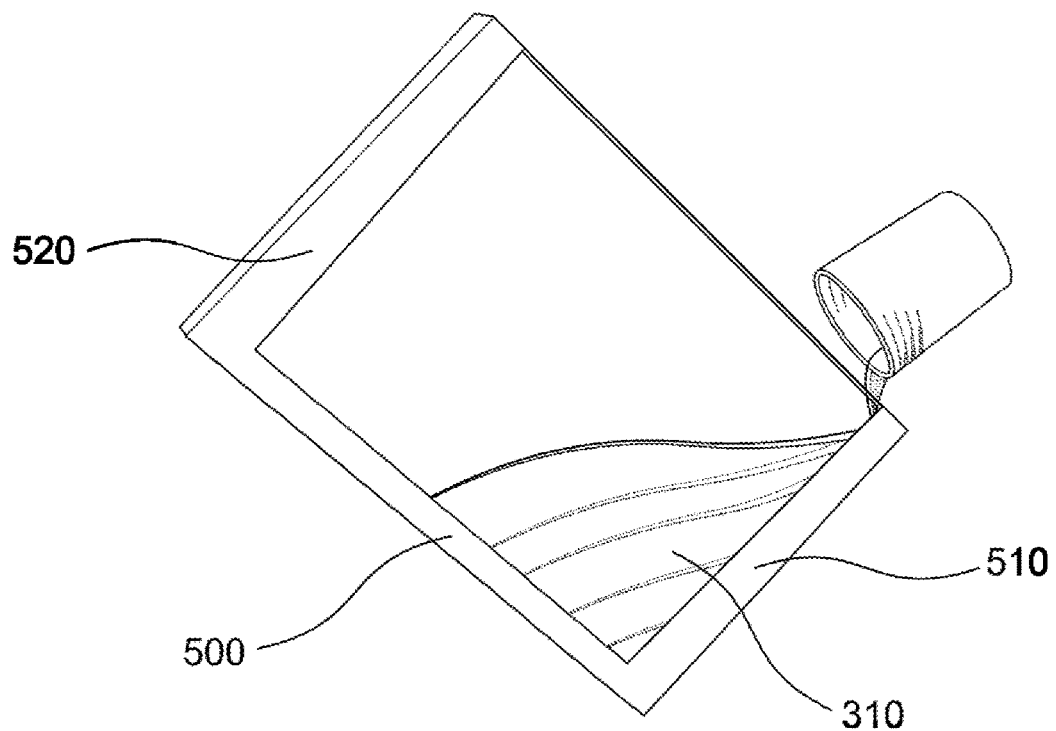

According to FIG. 15 the assembly obtained previously is tilted sideways and an adhesive 310 is filled into the gap between the substrate 100 and the cover layer 200 which is not sealed by seals. Due to the fact that the assembly is tilted sideways the filled adhesive can already wet the adhesive tape of the second seal 510. This wetting has been found to be advantageous for subsequent process steps.

Figure 16:
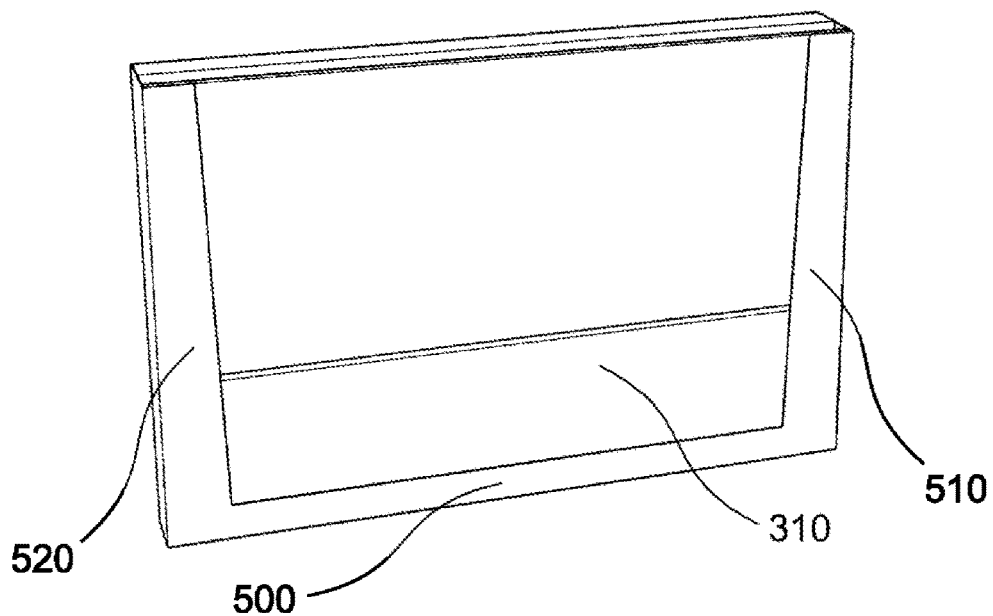

The assembly of FIG. 15 is then, as shown in FIG. 16, put back into an upright position. The adhesive 310 now flows uniformly into the lower part of the volume between the substrate 100 and the cover layer 200.

Figure 17:
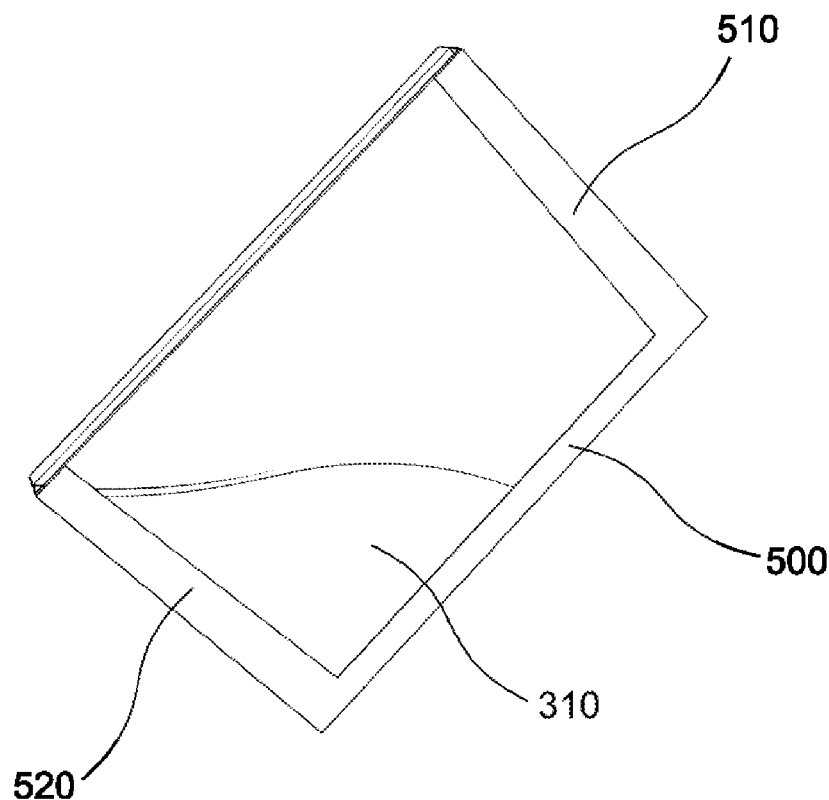

In order to be able to wet the adhesive tape of the third seal 520, too, with the adhesive 310, the assembly is tilted as shown in FIG. 17. Subsequently the assembly is put back into an upright position.

Figure 18:
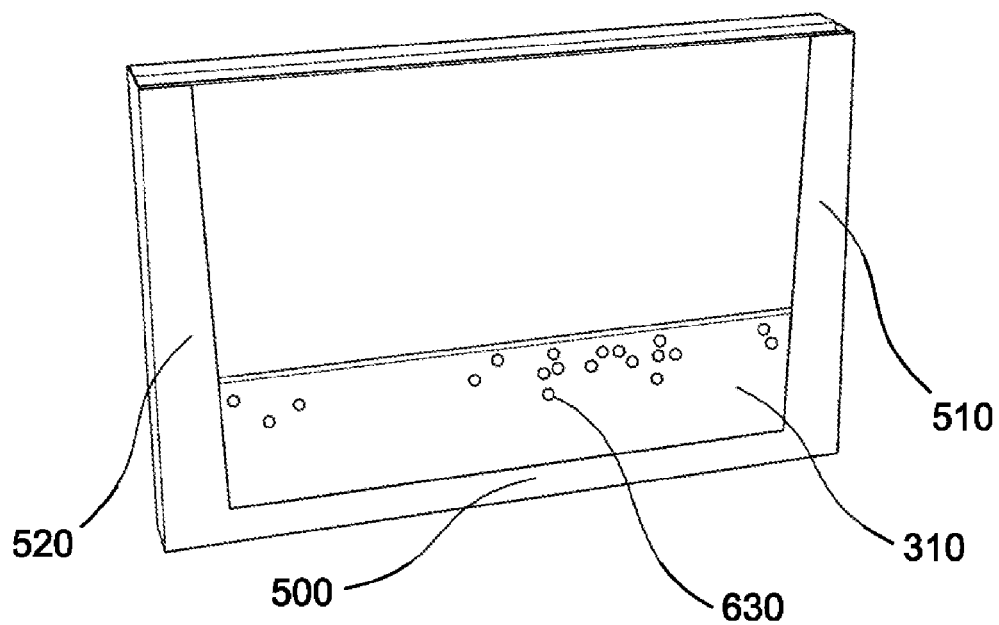
Figure 19:
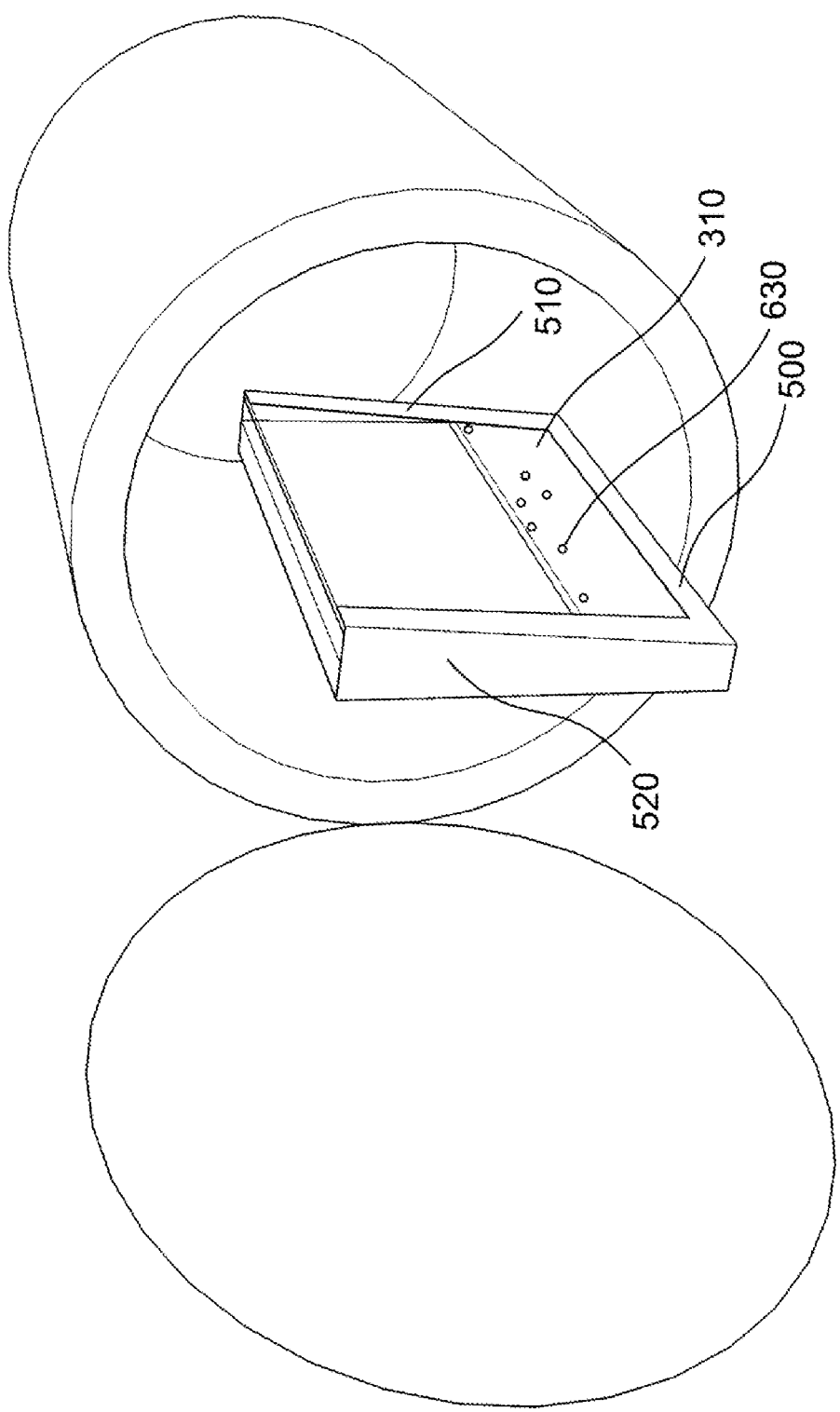

FIG. 18 shows how gas bubbles 630 possibly present in the adhesive 310 rise up and thereby exit the adhesive 310.

If desired, the degassing of the adhesive 310 can also be implemented with the aid of a vacuum. This is advantageous if shorter cycle times are desired and/or if the filled adhesive has a high viscosity. Such a vacuum chamber including an assembly according to the method is shown schematically in FIG. 19. It is an object of an embodiment of the method according to the invention that the filled adhesive 310 is subjected to a negative pressure. The pressure (absolute) may for example be in a range of ≥1 mbar to ≤800 mbar.

Figure 20:
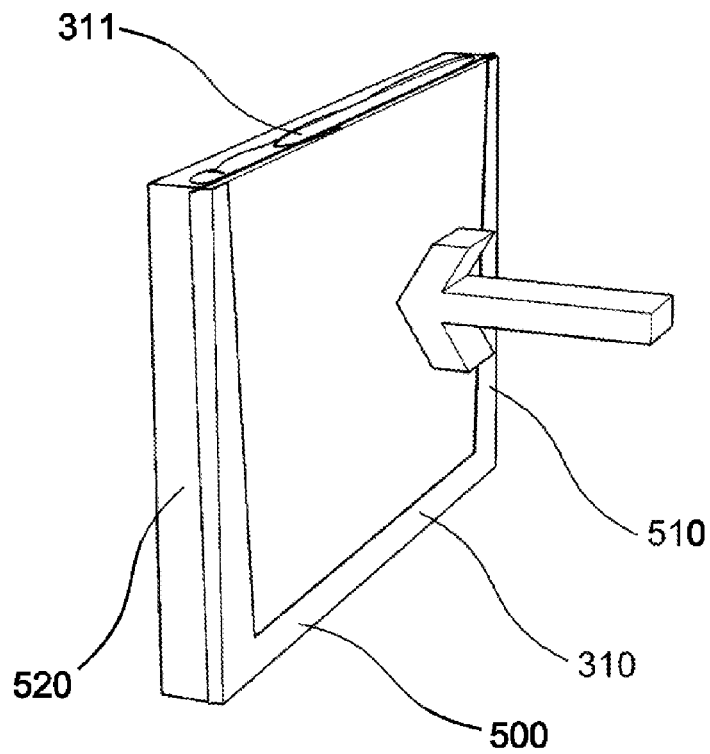

FIG. 20 shows how the substrate 100 and cover layer 200 in an upright standing form of the assembly are pivoted toward each other. The filled adhesive rises upwards. Excess adhesive 311 which has escaped can be stripped off. The arrow shown in FIG. 20 symbolizes the pressure applied to the substrate 100 and the cover layer 200.

Figure 21:
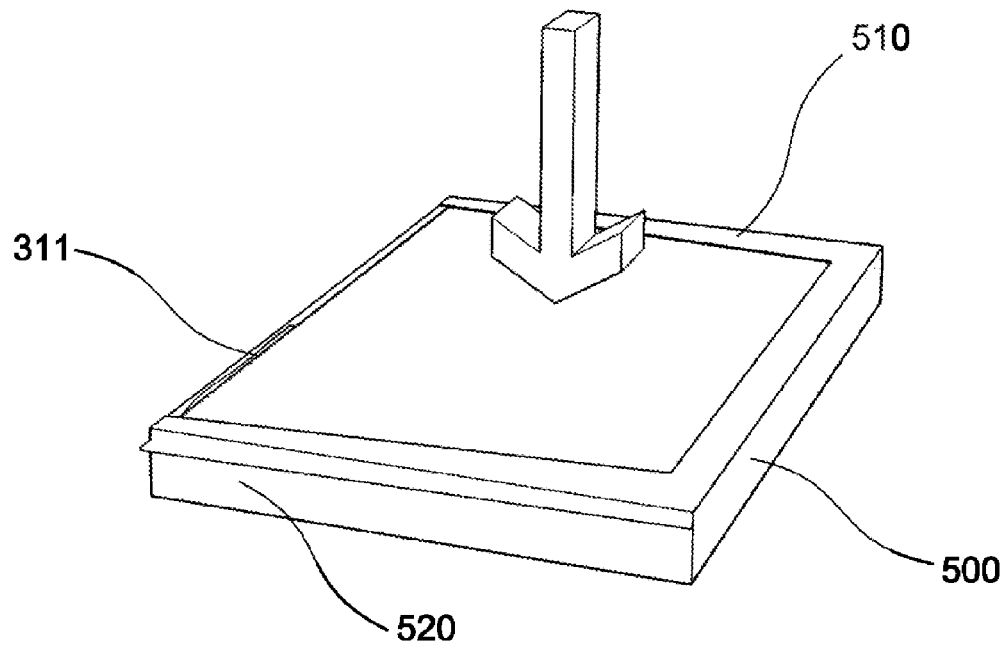

It is possible to deposit the assembly horizontally subsequently to the upright standing compressing of the substrate 100 and the cover layer 200. This case is shown in FIG. 21. The arrow shown in FIG. 21 also symbolizes the pressure applied to the substrate 100 and the cover layer 200. If, after the standing pivoting movement and the bonding of the substrate 100 and the cover layer 200 all gas bubbles have been removed with the exiting adhesive 310, by taking advantage also of the own weight of the substrate 100 and the cover layer 200, respectively, the adhesive is allowed to cure in the horizontal position. This is the subject matter of a preferred embodiment of the method according to the invention, according to which step B) is carried out until the substrate 100 and the cover layer 200 are standing parallel to each other and then the assembly obtained is disposed such that the major surfaces of the substrate 100 and the cover layer 200 are oriented horizontally.

The invention claimed is:

1. A method for producing a layered composite material, wherein said layered composite material comprises a substrate, a cover layer and an adhesive layer disposed between the substrate and the cover layer and the adhesive layer at least partially contacts the substrate and the cover layer, including the steps of:
A) providing an assembly which comprises a substrate and a cover layer, wherein
the substrate comprises a first substrate side with an upper substrate edge relative to a vertical direction, a lower substrate edge relative to the vertical direction, a first substrate side edge and a second substrate side edge disposed opposite to the first substrate side edge;
the cover layer comprises a first cover layer side with an upper cover layer edge relative to the vertical direction, a lower cover layer edge relative to the vertical direction, a first cover layer side edge and a second cover layer side edge disposed opposite to the first cover layer side edge;
the first substrate side and the first cover layer side face to each other in the assembly under an angle α and a bisector of the angle α is formed;
the upper substrate edge and the upper cover layer edge are disposed opposite to each other in the assembly;
the lower substrate edge and the lower cover layer edge are disposed opposite to each other in the assembly;
the first substrate side edge and the first cover layer side edge are disposed opposite to each other in the assembly;
the second substrate side edge and the second cover layer side edge are disposed opposite to each other in the assembly;
in the assembly the distance between the upper substrate edge and the upper cover layer edge is larger than the distance between the lower substrate edge and the lower cover layer edge;
in the assembly a first seal is provided between the lower substrate edge and the lower cover layer edge which prevents the escape of fluids between the lower substrate edge and the lower cover layer edge;
in the assembly a second seal is provided between the first substrate side edge and the first cover layer side edge which prevents the escape of fluids between the first substrate side edge and the first cover layer side edge;
in the assembly a third seal is provided between the second substrate side edge and the second cover layer side edge which prevents the escape of fluids between the second substrate side edge and the second cover layer side edge;
such that the assembly forms a one side open container for receiving fluids and further a curable adhesive is provided in said container;
B) pivoting the substrate and the cover layer towards each other such that the distance between the upper substrate edge and the upper cover layer edge decreases and the adhesive is moved towards the upper substrate edge and the upper cover layer edge,
wherein step B) is carried out such that during at least a part of step B) the orientation of the bisector of the angle α relative to vertical is in the range of ≥−45° to ≤45°.

2. The method according to claim 1, wherein step B) is carried out until the substrate and the cover layer are parallel to one another and then the assembly obtained is laid flat such that the first sides of the substrate and the cover layer are aligned horizontally.

3. The method according to claim 1, wherein the filled adhesive is subjected to negative pressure.

4. The method according to claim 1, wherein the substrate comprises a mineral material and/or the cover layer comprises a glass.

5. The method according to claim 1, wherein the substrate comprises an electrical functional unit and the cover layer comprises a glass.

6. The method according to claim 1, wherein the first seal, the second seal and/or the third seal are implemented in the form of an elastic film.

7. The method according to claim 1, wherein the first seal, the second seal and/or the third seal are implemented in the form of elastomeric surface portions with respect to which the substrate and the cover layer are movable.

8. The method according to claim 1, wherein the first seal, the second seal and/or the third seal are implemented in the form of a fluidically expandable sealing member with respect to which the substrate and the cover layer are movable.

9. The method according to claim 1, wherein further an electrical functional unit is provided between the substrate and the cover layer.

10. The method according to claim 1, wherein in step B) the adhesive is set in vibration.

11. The method according to claim 1, wherein step B) further comprises pivoting the substrate and the cover layer away from each other subsequent to pivoting toward each other.

12. The method according to claim 1, wherein in step A) and/or in step B) the assembly is at least partly temporarily tilted with respect to the horizontal.

* * * * *